United States Patent
Moore et al.

(10) Patent No.: US 10,632,717 B2
(45) Date of Patent: Apr. 28, 2020

(54) LASER-REFLECTIVE COMPACTION ROLLER AND ASSOCIATED FIBER PLACEMENT SYSTEM AND METHOD

(71) Applicant: The Boeing Company, Chicago, IL (US)

(72) Inventors: Stephen G. Moore, Renton, WA (US); Alexandra K. Dillon, Seattle, WA (US); Alan G. Burg, Des Moines, WA (US); Megan M. Petersen, Seattle, WA (US)

(73) Assignee: The Boeing Company, Chicago, IL (US)

( * ) Notice: Subject to any disclaimer, the term of this patent is extended or adjusted under 35 U.S.C. 154(b) by 307 days.

(21) Appl. No.: 14/710,844

(22) Filed: May 13, 2015

(65) Prior Publication Data

US 2016/0332434 A1 Nov. 17, 2016

(51) Int. Cl.
| | |
|---|---|
| *B29C 35/08* | (2006.01) |
| *B29C 65/16* | (2006.01) |
| *B29C 70/38* | (2006.01) |
| *B32B 5/10* | (2006.01) |
| *B29C 65/14* | (2006.01) |

(52) U.S. Cl.
CPC ............ *B32B 5/10* (2013.01); *B29C 35/0805* (2013.01); *B29C 65/1412* (2013.01); *B29C 65/1422* (2013.01); *B29C 65/1612* (2013.01); *B29C 65/1622* (2013.01); *B29C 70/38* (2013.01);
(Continued)

(58) Field of Classification Search
CPC ........ B29C 35/0805; B29C 2035/0822; B29C 2035/0838; B29C 65/14; B29C 65/1412; B29C 65/1416; B29C 65/1419; B29C 65/1422; B29C 65/16; B29C 65/1612; B29C 65/1616; B29C 65/1619; B29C 65/1622; B29C 65/1632; B29C 66/8362; B29C 70/34; B29C 70/38; B29C 70/382; B29C 70/384; B29C 70/386; B29C 70/388

See application file for complete search history.

(56) References Cited

U.S. PATENT DOCUMENTS

| | | | |
|---|---|---|---|
| 2,630,620 A | * | 3/1953 | Rand ........................ D06Q 1/04 428/87 |
| 5,015,326 A | | 5/1991 | Frank |

(Continued)

FOREIGN PATENT DOCUMENTS

| | | | |
|---|---|---|---|
| WO | WO 2014/029377 A1 | * | 2/2014 |
| WO | WO 2015/018799 A1 | * | 2/2015 |

OTHER PUBLICATIONS

Bennett, Jean. Ashley, E. J. "Infrared Reflectance and Emittance of Silver and Gold Evaporated in Ultrahigh Vacuum". Applied Optics, vol. 4, No. 2. Feb. 1965.*

(Continued)

*Primary Examiner* — Michael A Tolin
(74) *Attorney, Agent, or Firm* — Walters & Wasylyna LLC

(57) ABSTRACT

A fiber placement system including a compaction roller rotatable about an axis of rotation, the compaction roller including a reflective layer that includes a reflective material dispersed in a polymeric material, and a light source positioned to project a beam of electromagnetic radiation proximate the compaction roller, the beam having a wavelength, wherein the reflective material has a reflectance of at least 80 percent at the wavelength.

20 Claims, 5 Drawing Sheets

(52) U.S. Cl.
CPC .... *B29C 70/388* (2013.01); *B29C 2035/0822* (2013.01); *B29C 2035/0838* (2013.01)

(56) References Cited

U.S. PATENT DOCUMENTS

| | | |
|---|---|---|
| 6,390,169 B1 | 5/2002 | Johnson |
| 6,451,152 B1 | 9/2002 | Holmes et al. |
| 6,799,619 B2 | 10/2004 | Holmes et al. |
| 6,814,822 B2 | 11/2004 | Holmes et al. |
| 7,993,124 B2 * | 8/2011 | Nelson ................ B29C 70/38 156/379.8 |
| 8,191,596 B2 * | 6/2012 | Hamlyn ............... B29C 70/384 156/433 |
| 8,388,884 B2 | 3/2013 | Nelson et al. |
| 9,328,798 B2 * | 5/2016 | Lotz ...................... F16G 1/08 |
| 2006/0048881 A1 | 3/2006 | Evans et al. |
| 2011/0011538 A1 | 1/2011 | Hamlyn et al. |

OTHER PUBLICATIONS

Mondo et al., "Overview of Thermoplastic Composite ATL and AFP Technologies," Tencate Advanced Composites USA Inc. (2012).
Lamontia et al., "Conformable Compaction System Used in Automated Fiber Placement of Large Composite Aerospace Structures," Accudyne Systems, Inc. (2002).

* cited by examiner

LASER-REFLECTIVE COMPACTION ROLLER AND ASSOCIATED FIBER PLACEMENT SYSTEM AND METHOD

FIELD

This application relates to fiber placement and, more particularly, to laser-assisted fiber placement.

BACKGROUND

Composite structures are commonly used as high-strength, low-weight materials. A composite structure includes one or more composite layers, wherein each composite layer includes a reinforcement material and a matrix material. The reinforcement material may include fibers. The matrix material may be a polymeric material, such as a thermosetting resin or a thermoplastic resin.

Fiber-reinforced composite structures may be manufactured by laying up multiple layers of fiber tow to form a reinforcement layup. The fiber tow generally includes a bundle of fibers (reinforcement material) impregnated with a matrix material. In fiber placement technologies, the fiber tow is generally supplied in strip/tape form from a bulk reel and is pressed onto the underlying layup at a compaction nip using a compaction roller. The fully assembled reinforcement layup is then cured and/or consolidated, as necessary, to from the composite structure.

When the matrix material of the fiber tow is a thermoplastic resin, the layup process typically requires heating to soften the thermoplastic resin and obtain layer-to-layer consolidation within the reinforcement layup. For example, a laser beam (e.g., an infrared laser beam) may be projected at or near the compaction nip to heat the fiber tow and/or the underlying layup during fiber placement. However, over time, the laser light may degrade the compaction roller.

Accordingly, those skilled in the art continue with research and development efforts in the field of laser-assisted fiber placement.

SUMMARY

In one embodiment, the disclosed fiber placement system may include a compaction roller rotatable about an axis of rotation, the compaction roller including a reflective layer having a reflective material dispersed in a polymeric material, and a light source positioned to project a beam of electromagnetic radiation proximate the compaction roller, the beam having a wavelength, wherein the reflective material has a reflectance of at least 80 percent at the wavelength.

In another embodiment, the disclosed fiber placement system may include a substrate, a compaction roller positioned relative to the substrate to define a nip therebetween, the compaction roller being rotatable about an axis of rotation, the compaction roller including a hub and a concentric layered structure coaxially received over the hub, the concentric layered structure including a core layer and a reflective layer, the core layer being positioned between the hub and the reflective layer, the reflective layer including a reflective material dispersed in a polymeric material, a bulk reel of composite ply, wherein the composite ply extends from the bulk reel and through the nip, and a light source positioned to project a beam of electromagnetic radiation proximate the nip, the beam having a wavelength, wherein the reflective material has a reflectance of at least 80 percent at the wavelength.

In another embodiment, the disclosed laser-reflective compaction roller may include a hub defining an axis of rotation and a concentric layered structure coaxially received over the hub, the concentric layered structure including a reflective layer including a reflective material dispersed in a polymeric material and a core layer positioned between the hub and the reflective layer, and a cover positioned over the concentric layered structure.

In yet another embodiment, disclosed is a method for placing a composite ply on a substrate. The method may include steps of (1) positioning a compaction roller against the substrate to define a nip therebetween, the compaction roller including a reflective layer, the reflective layer including a reflective material dispersed in a polymeric material; (2) projecting a beam of electromagnetic radiation proximate the nip; and (3) passing the composite ply through the nip.

Other embodiments of the disclosed laser-reflective compaction roller and associated fiber placement system and method will become apparent from the following detailed description, the accompanying drawings and the appended claims.

DETAILED DESCRIPTION

The disclosed fiber placement system and method may be used to apply a fiber-reinforced composite ply onto a substrate. The fiber-reinforced composite ply and/or the substrate may be heated with electromagnetic radiation and compacted with the disclosed laser-reflective compaction roller during the fiber placement process. The disclosed laser-reflective compaction roller may be resistant to degradation due to exposure to the electromagnetic radiation used for heating.

Figure 1:
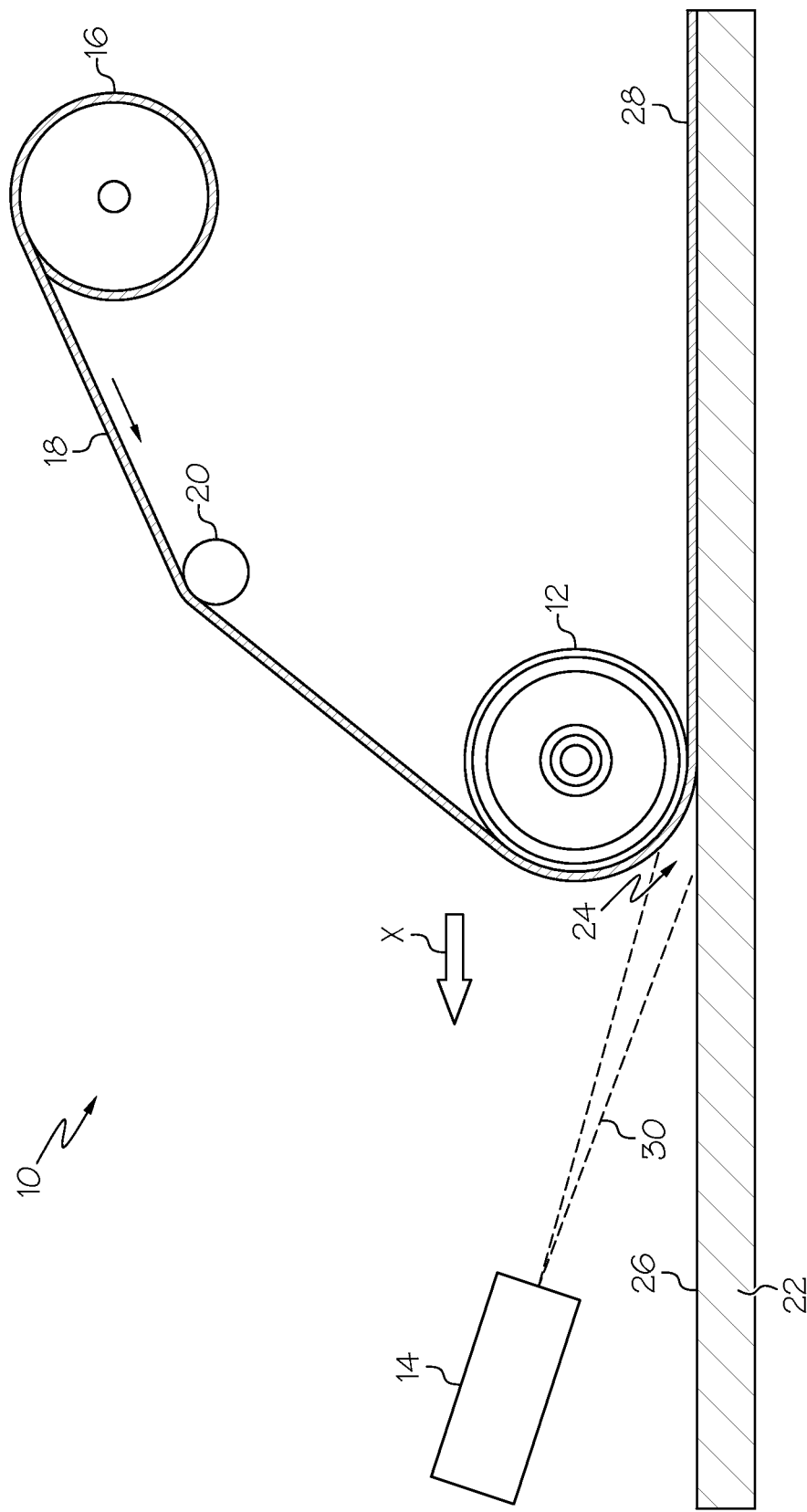
FIG. 1 is a schematic side elevational view of one embodiment of the disclosed fiber placement system.

Referring to FIG. 1, one embodiment of the disclosed fiber placement system, generally designated 10, may include a compaction roller 12, a light source 14, and a bulk reel 16 of composite ply 18. The fiber placement system 10 may include various additional components, such as one or more guide rollers 20 and/or a drive mechanism for urging the compaction roller 12 in the direction shown by arrow X, without departing from the scope of the present disclosure.

At this point, those skilled in the art will appreciate that the disclosed fiber placement system 10 may be associated with an Advanced Fiber Placement (AFP) machine. For example, the roller 12 of the fiber placement system 10 may be at least partially housed within the application head of an Advanced Fiber Placement machine. The application head of the Advanced Fiber Placement machine may be moveable, such as by way of a robotic arm.

The composition of the composite ply 18 supplied from the bulk reel 16 of the disclosed fiber placement system 10 may vary depending on need/application. In one aspect, the composite ply 18 may be a fiber-reinforced material that includes a reinforcement material and a matrix material. The reinforcement material may be (or may include) fibers, such as carbon fibers. The fibers may be oriented in a single direction (e.g., uni-directional) or in two or more directions (e.g., bi-directional). The matrix material may be (or may include) a polymeric matrix material, such as a thermosetting resin and/or a thermoplastic resin. In another aspect, the composite ply 18 may be unreinforced (e.g., a resin-only material).

As one specific, non-limiting example, the composite ply 18 may be a thermoplastic tow (or slit tape). The thermoplastic tow may include a reinforcement material (e.g., carbon fiber) and a thermoplastic polymer. Specific examples of thermoplastic polymers that may be used to form a thermoplastic tow suitable for use as the composite ply 18 include, without limitation, polyether ether ketone (PEEK), polyether ketone ketone (PEKK), polyphenaline sulfide (PPS), polyethylene, polypropylene, and polystyrene.

The compaction roller 12 of the disclosed fiber placement system 10 may be rotatable about an axis of rotation A (FIG. 3), and may be positioned against a substrate 22 to define a nip 24 between the compaction roller 12 and the surface 26 of the substrate 22. The substrate 22 may be any structure or arrangement of material capable of receiving the composite ply 18 on the surface 26 thereof. As one example, the substrate 22 may be a reinforcement layup that includes one or more previously-applied layers of the composite ply 18. As another example, the substrate 22 may be a composite backing material, such as a backing cloth.

The composite ply 18 may be unwound from the bulk reel 16, may pass over the guide roller 20, and may extend over the compaction roller 12. As the composite ply 18 passes through the nip 24, the compaction roller 12 may urge the composite ply 18 against the surface 26 of the substrate 22. Furthermore, as the compaction roller 12 moves relative to the substrate 22 (e.g., in the direction shown by arrow X), a composite layer 28 may be formed over the surface 26 of the substrate 22. Multiple layers 28 may be applied to the substrate 22 in this manner.

The light source 14 of the disclosed fiber placement system 10 may be positioned to project a beam 30 of electromagnetic radiation proximate (at or near) the compaction roller 12, such as proximate (at or near) the nip 24 between the compaction roller 12 and the substrate 22. Therefore, the beam 30 may heat a portion of the composite ply 18 and/or a portion of the substrate 22 just prior to, or simultaneously with, that portion of the composite ply 18 passing through the nip 24. When the composite ply 18 and/or the substrate 22 includes a thermoplastic material, the heat from the light source 14 may soften the thermoplastic material, thereby rendering it tacky and facilitating consolidation between the composite ply 18 and the substrate 22.

In one particular implementation, the light source 14 may be a laser and the beam 30 may be a laser beam. Therefore, the electromagnetic radiation emitted by the light source 14 may be concentrated into a relatively small spot on the composite ply 18 and/or the substrate 22. The spacing between the laser light source 14 and the nip 24 and/or the divergence of the laser beam 30 may be controlled to achieve the desired spot size on the composite ply 18 and/or the substrate 22.

The wavelength of the electromagnetic radiation emitted by the light source 14 may be a design consideration and may depend, for example, on the composition of the composite ply 18, among other possible factors. Since heating of the composite ply 18 and/or the substrate 22 is desired, the light source 14 may emit electromagnetic radiation within the infrared band of the electromagnetic spectrum. In one expression, the light source 14 may be a near-infrared (NIR) laser, and the beam 30 may have a wavelength ranging from about 0.75 µm to about 1.4 µm. In another expression, the light source 14 may be a short-wavelength infrared (SWIR) laser, and the beam 30 may have a wavelength ranging from about 1.4 µm to about 3 µm. In another expression, the light source 14 may be a mid-wavelength infrared (MWIR) laser, and the beam 30 may have a wavelength ranging from about 3 µm to about 8 µm. In another expression, the light source 14 may be a long-wavelength infrared (LWIR) laser, and the beam 30 may have a wavelength ranging from about 8 µm to about 15 µm. In yet another expression, the light source 14 may be a far-infrared (FIR) laser, and the beam 30 may have a wavelength ranging from about 15 µm to about 1,000 µm.

The beam 30 emitted by the light source 14 may be directed proximate the nip 24 between the compaction roller 12 and the substrate 22. Therefore, the compaction roller 12 may be exposed to the beam 30. As is described in greater detail herein, the compaction roller 12 may be laser-reflective and, as such, degradation of the compaction roller 12 due to exposure to the beam 30 will be significantly reduced, if not eliminated (vis-à-vis traditional compaction rollers).

Figure 2:
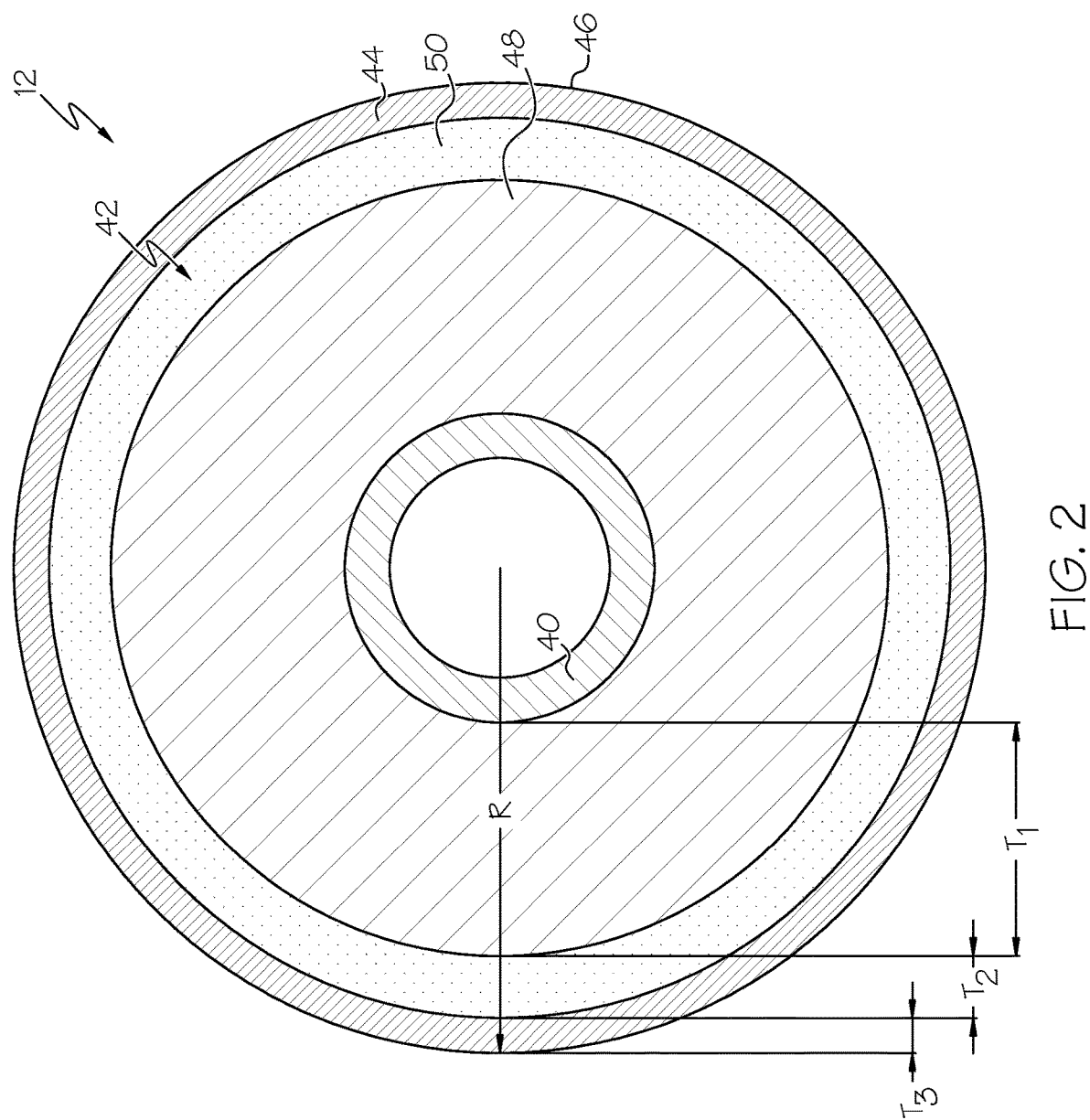
FIG. 2 is a side elevational view, in cross-section, of one embodiment of the disclosed laser-reflective compaction roller.
Figure 3:
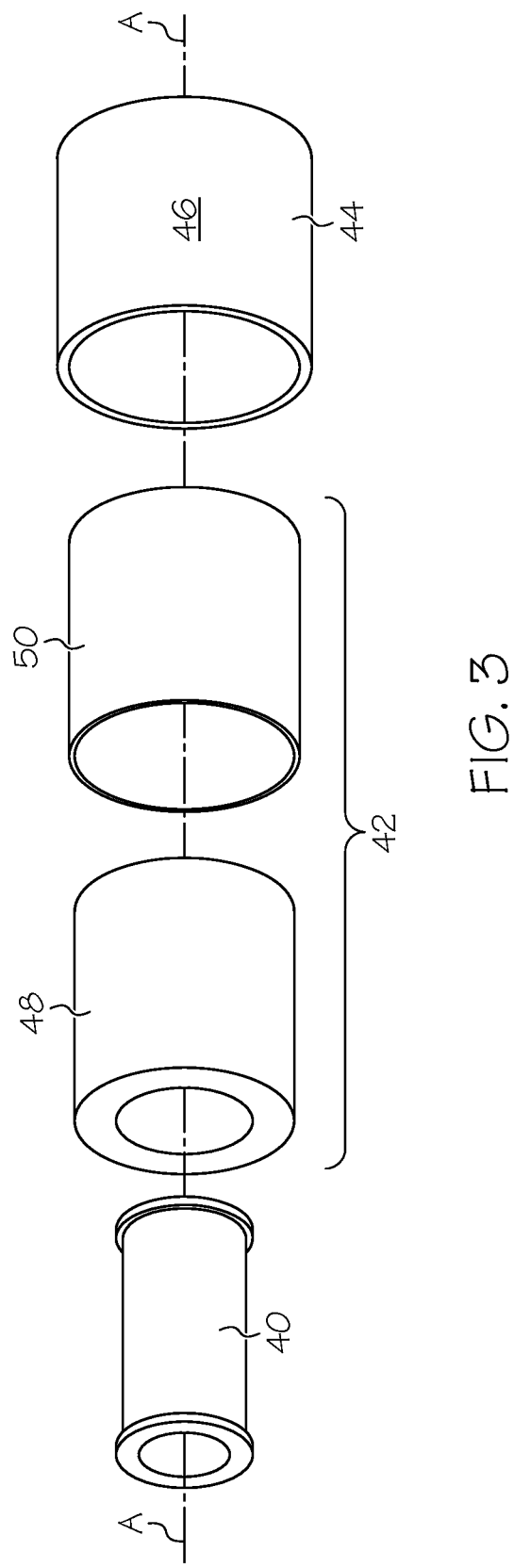
FIG. 3 is an exploded perspective of the laser-reflective compaction roller of FIG. 2.

Referring to FIGS. 2 and 3, in one embodiment, the compaction roller 12 of the disclosed fiber placement system 10 (FIG. 1) may include a hub 40 and a concentric layered structure 42 coaxially received over the hub 40. Optionally, the compaction roller 12 may additionally include a cover 44 received over the concentric layered structure 42 to define the outer surface 46 of the compaction roller 12. Without the cover 44, the outer surface of the compaction roller 12 may be defined by the outer surface of the concentric layered structure 42.

The hub 40 of the compaction roller 12 may facilitate mounting of the compaction roller 12 (e.g., in an Advanced Fiber Placement machine) and rotation of the compaction roller 12 about an axis of rotation A (FIG. 3). Additionally, the hub 40 may support thereon the concentric layered structure 42.

The concentric layered structure 42 of the compaction roller 12 may include a core layer 48 and a reflective layer 50. The reflective layer 50 may be positioned adjacent to, but radially outside of, the core layer 48. Additional layers may be included in the concentric layered structure 42 of the compaction roller 12, such as between the core layer 48 and the reflective layer 50 and/or between the core layer 48 and the hub 40, without departing from the scope of the present disclosure.

The core layer 48 of the concentric layered structure 42 of the compaction roller 12 may be formed from a heat-resistant polymeric material. In one expression, the polymeric material forming the core layer 48 may be capable of withstanding temperatures in excess of 100° C. without significant degradation. In another expression, the polymeric material forming the core layer 48 may be capable of withstanding temperatures in excess of 150° C. without significant degradation. In another expression, the polymeric material forming the core layer 48 may be capable of withstanding temperatures in excess of 200° C. without significant degradation. In another expression, the polymeric material forming the core layer 48 may be capable of withstanding temperatures in excess of 250° C. without significant degradation. In another expression, the polymeric material forming the core layer 48 may be capable of withstanding temperatures in excess of 300° C. without significant degradation.

The core layer 48 of the concentric layered structure 42 may have a hardness appropriate for use in connection with the compaction roller 12. In one expression, the core layer 48 may have a hardness ranging from about 25 Shore A durometer to about 90 Shore A durometer. In another expression, the core layer 48 may have a hardness ranging from about 30 Shore A durometer to about 80 Shore A durometer. In another expression, the core layer 48 may have a hardness ranging from about 30 Shore A durometer to about 70 Shore A durometer. In another expression, the core layer 48 may have a hardness ranging from about 35 Shore A durometer to about 60 Shore A durometer. In yet another expression, the core layer 48 may have a hardness ranging from about 40 Shore A durometer to about 60 Shore A durometer.

Various compositions may be used to form the core layer 48 of the concentric layered structure 42 of the compaction roller 12. To facilitate molding of the concentric layered structure 42, as is described in greater detail herein, the core layer 48 may be formed from a castable polymeric material, such as a castable thermosetting resin and/or a castable thermoplastic resin.

As one general, non-limiting example, the core layer 48 may be formed from a silicone material. The silicone material may be an unfilled silicone material. As one specific, non-limiting example, the core layer 48 may be formed from KE-7021U silicone, which is commercially available from Shin-Etsu Chemical Company of Akron, Ohio. As another specific, non-limiting example, the core layer 48 may be formed from KE-7022U silicone, which is also commercially available from Shin-Etsu Chemical Company. As another general, non-limiting example, the core layer 48 may be formed from a urethane material (e.g., polyurethane). Using combinations of polymeric materials is also contemplated.

The reflective layer 50 of the concentric layered structure 42 of the compaction roller 12 may be positioned radially outside of the core layer 48. Therefore, the reflective layer 50 may cover the core layer 48 and may protect the core layer 48 from the beam 30 (FIG. 1) emitted by the light source 14 (FIG. 1).

The reflective layer 50 of the concentric layered structure 42 may be relatively thin compared to the core layer 48. Therefore, the core layer 48 may form the bulk of the concentric layered structure 42. Referring to FIG. 2, the compaction roller 12 may have a radius R, the core layer 48 may have a first radial thickness $T_1$, and the reflection layer 50 may have a second radial thickness $T_2$. The radial thickness $T_1$ of the core layer 48 may be greater than the radial thickness $T_2$ of the reflective layer 50. In one expression, the radial thickness $T_2$ of the reflective layer 50 may be at most about 50 percent of the radial thickness $T_1$ of the core layer 48. In another expression, the radial thickness $T_2$ of the reflective layer 50 may be at most about 40 percent of the radial thickness $T_1$ of the core layer 48. In another expression, the radial thickness $T_2$ of the reflective layer 50 may be at most about 30 percent of the radial thickness $T_1$ of the core layer 48. In another expression, the radial thickness $T_2$ of the reflective layer 50 may be at most about 20 percent of the radial thickness $T_1$ of the core layer 48. In another expression, the radial thickness $T_2$ of the reflective layer 50 may be at most about 10 percent of the radial thickness $T_1$ of the core layer 48. In yet another expression, the radial thickness $T_2$ of the reflective layer 50 may be at most about 5 percent of the radial thickness $T_1$ of the core layer 48.

The reflective layer 50 of the concentric layered structure 42 of the compaction roller 12 may be formed from a polymeric material and a reflective material dispersed in the polymeric material. Dispersing the reflective material in the polymeric material may render the reflective layer 50 reflective to the electromagnetic radiation (beam 30 in FIG. 1) emanating from the light source 14 (FIG. 1). Therefore, since the reflective layer 50 is positioned radially outside of the core layer 48, electromagnetic radiation-induced degradation of the compaction roller 12 may be significantly reduced (if not eliminated).

The polymeric material of the reflective layer 50 may be the same as, or similar to, the polymeric material forming the core layer 48. However, it is also contemplated that the polymeric material of the reflective layer 50 may be substantially different from the polymeric material of the core layer 48.

The polymeric material of the reflective layer 50 of the concentric layered structure 42 of the compaction roller 12 may be heat-resistant. In one expression, the polymeric material of the reflective layer 50 may be capable of withstanding temperatures in excess of 100° C. without significant degradation. In another expression, the polymeric material of the reflective layer 50 may be capable of withstanding temperatures in excess of 150° C. without significant degradation. In another expression, the polymeric material of the reflective layer 50 may be capable of withstanding temperatures in excess of 200° C. without significant degradation. In another expression, the polymeric material of the reflective layer 50 may be capable of withstanding temperatures in excess of 250° C. without significant degradation. In another expression, the polymeric material of the reflective layer 50 may be capable of withstanding temperatures in excess of 300° C. without significant degradation.

Like the core layer 48 of the concentric layered structure 42, the reflective layer 50 may have a hardness appropriate for use in connection with the compaction roller 12. In one expression, the polymeric material of the reflective layer 50 (as cured/cast) may have a hardness ranging from about 25 Shore A durometer to about 90 Shore A durometer. In another expression, the polymeric material of the reflective layer 50 may have a hardness ranging from about 30 Shore A durometer to about 80 Shore A durometer. In another expression, the polymeric material of the reflective layer 50 may have a hardness ranging from about 30 Shore A durometer to about 70 Shore A durometer. In another expression, the polymeric material of the reflective layer 50 may have a hardness ranging from about 35 Shore A durometer to about 60 Shore A durometer. In yet another expression, the polymeric material of the reflective layer 50 may have a hardness ranging from about 40 Shore A durometer to about 60 Shore A durometer.

Furthermore, like the core layer 48 of the concentric layered structure 42, the polymeric material of the reflective layer 50 may have various compositions. To facilitate molding of the concentric layered structure 42, as is described in greater detail herein, the polymeric material of the reflective layer 50 may be a castable polymeric material, such as a castable thermosetting resin and/or a castable thermoplastic resin.

As one general, non-limiting example, the polymeric material of the reflective layer 50 may be a silicone material. As one specific, non-limiting example, the polymeric material of the reflective layer 50 may be KE-7021U silicone. As another specific, non-limiting example, the polymeric material of the reflective layer 50 may be KE-7022U silicone. As another general, non-limiting example, the polymeric material of the reflective layer 50 may be a urethane material (e.g., polyurethane). Using combinations of polymeric materials is also contemplated.

The reflective material of the reflective layer 50 may be any material capable of being dispersed in the polymeric material forming the reflective layer 50 to render reflective the reflective layer 50. Without limitation, the reflective material may be (or may include) particles, a powder, a pigment, flakes (e.g., leafing flakes), and the like.

In a particular implementation, the reflective material of the reflective layer 50 may include high aspect ratio materials (e.g., flakes). As used herein, the aspect ratio refers to the largest transverse dimension of a material/flake relative to the thickness of the material/flake. In one expression, the reflective material may include flakes having an average aspect ratio of at least about 5:1. In another expression, the reflective material may include flakes having an average aspect ratio of at least about 10:1. In yet another expression, the reflective material may include flakes having an average aspect ratio ranging from about 10:1 to 100:1.

The composition of the reflective material of the reflective layer 50 may be selected based on the wavelength (or wavelengths) of the beam 30 (FIG. 1) emitted by the light source 14 (FIG. 1). Therefore, the reflectance of the compaction roller 12 may be tuned to the light source 14. In one expression, the reflective material may exhibit a reflectance of at least 80 percent at the relevant wavelength (the wavelength of beam 30). In another expression, the reflective material may exhibit a reflectance of at least 85 percent at the relevant wavelength. In another expression, the reflective material may exhibit a reflectance of at least 90 percent at the relevant wavelength. In another expression, the reflective material may exhibit a reflectance of at least 95 percent at the relevant wavelength. In yet another expression, the reflective material may exhibit a reflectance of at least 98 percent at the relevant wavelength.

At this point, those skilled in the art will appreciate that the reflective material of the reflective layer 50 may have various compositions without departing from the scope of the present disclosure. Reflective material selection considerations may include the wavelength of the beam 30 (FIG. 1), as well as material stability, compatibility (e.g., with the polymeric material of the reflective layer 50) and, of course, cost, among other possible considerations.

In one particular formulation, the reflective material of the reflective layer 50 may be a metallic material (a metal or a metal alloy), such as metallic flakes and/or metallic powders. As one specific, non-limiting example, the reflective material may be silver (e.g., silver flakes and/or silver powder), which exhibits a reflectance greater than 98 percent at a wavelength of 1.06 μm (near-infrared). Other examples of metallic reflective materials suitable for use in connection with a near-infrared beam 30 (FIG. 1) include, without limitation, gold, nickel, aluminum and copper.

In another particular formulation, the reflective material of the reflective layer 50 may be a pigment. As one general, non-limiting example, the reflective material may be (or may include) a metal oxide pigment. Two specific, non-limiting examples include titanium dioxide ($TiO_2$) and zinc oxide (ZnO).

The concentration of the reflective material dispersed within the polymeric material of the reflective layer 50 (e.g., the mass of reflective material per volume of polymeric material) may be a design consideration, and may depend on various factors, such as the composition of the reflective material, the physical state (e.g., fine powder versus flake) of the reflective material, the radial thickness $T_2$ (FIG. 2) of the reflective layer 50, and the desired hardness of the reflective layer 50, among other possible factors. In one expression, the reflective material may account for about 0.5 percent by weight to about 30 percent by weight of the reflective layer 50. In another expression, the reflective material may account for about 1 percent by weight to about 20 percent by weight of the reflective layer 50. In yet another expression, the reflective material may account for about 2 percent by weight to about 10 percent by weight of the reflective layer 50.

Those skilled in the art will appreciate that the concentration should be sufficiently high to achieve the desired result—reflecting away electromagnetic radiation. However, dispersing excess quantities may significantly increase manufacturing costs without a providing a proportional benefit. Furthermore, concentrations of reflective material that are too high may inhibit, if not prevent, casting of the reflective layer 50.

Still referring to FIGS. 2 and 3, the optional cover 44 may be positioned over the concentric layered structure 42. The cover 44 may include a relatively thin layer (e.g., a radial thickness $T_3$ (FIG. 2) of about 10 mil to about 20 mil, wherein 1 mil equals 1 thousandth of a inch) of release material, such as fluorinated ethylene propylene (FEP). Functionally, the cover 44 may serve as a barrier to reduce, if not eliminate, the transfer of material (polymeric material and/or reflective material) from the compaction roller 12 to the composite ply 18

Figure 4:
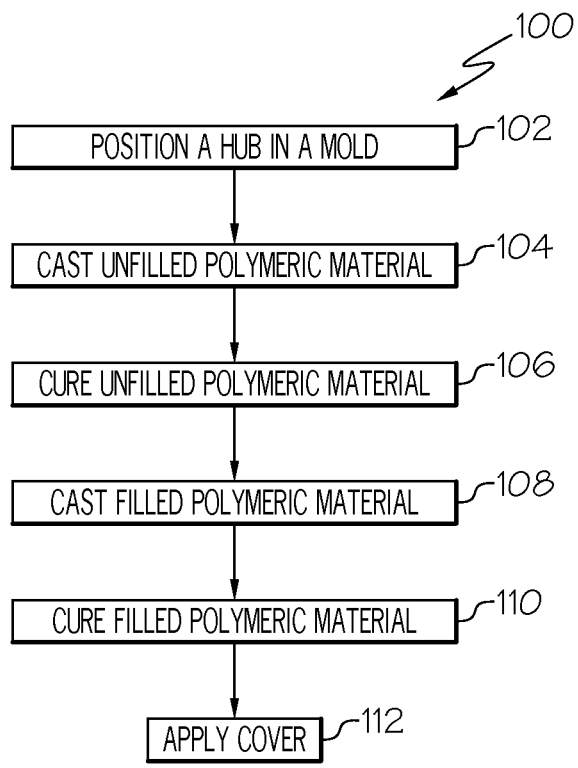
FIG. 4 is a flow diagram depicting one embodiment of the disclosed method for manufacturing a laser-reflective compaction roller.

Also disclosed is a method for manufacturing a laser-reflective compaction roller. Referring to FIG. 4, one embodiment of the disclosed method for manufacturing a laser-reflective compaction roller, generally designated 100, may begin at Block 102 with the step of positioning a hub in a mold.

At Block 104, a castable unfilled polymeric material may be cast into the mold. The unfilled polymeric material may be heat-resistant and may have the desired hardness (upon curing).

At Block 106, the unfilled polymeric material may be cured to form the core layer 48 of the concentric layered structure 42, as shown in FIGS. 2 and 3. The curing step (Block 106) may depend on the composition of the unfilled polymeric material. As one example, the curing step (Block 106) may involve heating, such as when the unfilled polymeric material is a thermosetting resin. As another example, the curing step (Block 106) may involve cooling, such as when the unfilled polymeric material is a thermoplastic resin.

At Block 108, a castable filled polymeric material may be cast into the mold. The filled polymeric material may include a reflective material dispersed therein, and may be heat-resistant and may have the desired hardness (upon curing).

At Block 110, the filled polymeric material may be cured to form the reflective layer 50 of the concentric layered structure 42, as shown in FIGS. 2 and 3. The curing step (Block 110) may depend on the composition of the filled polymeric material. As one example, the curing step (Block 110) may involve heating, such as when the filled polymeric material includes a thermosetting resin. As another example, the curing step (Block 110) may involve cooling, such as when the filled polymeric material includes a thermoplastic resin.

At Block 112, a cover may optionally be applied over the cured filled polymeric material. For example, the cover may be a sheet of fluorinated ethylene propylene (FEP) that may be applied by heat-shrinking the sheet onto the cured filled polymeric material.

Referring back to FIGS. 2 and 3, in an alternative embodiment, the compaction roller 12 of the disclosed fiber placement system 10 (FIG. 1) may include a hub 40, a reflective layer 50 and an optional cover 44—the core layer 48 may be omitted. For example, the radially thickness $T_2$ of the reflective layer 50 may be increased to accommodate for the absence of the core layer 48.

Figure 5:
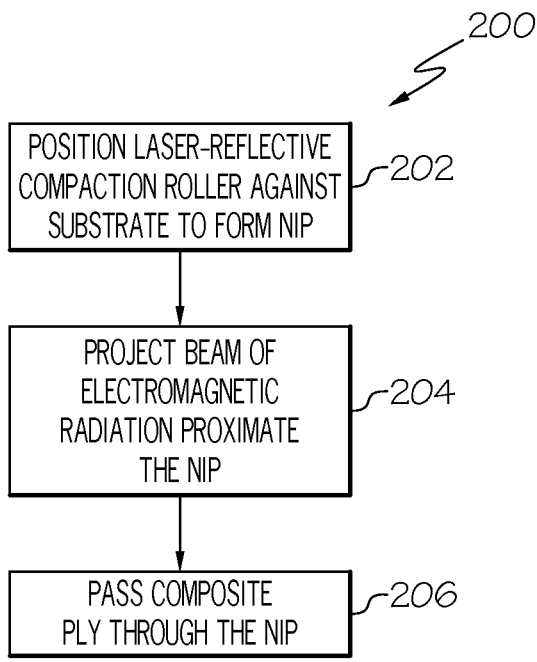
FIG. 5 is a flow diagram depicting one embodiment of the disclosed fiber placement method.

Also disclosed is a fiber placement method, which may be used to place a composite ply on a substrate. Referring to FIG. 5, with additional reference to FIG. 1, one embodiment of the disclosed fiber placement method, generally designated 200, may begin at Block 202 with the step of positioning a compaction roller 12 against a substrate 22 to form a nip 24 between the compaction roller 12 and the substrate 22. The compaction roller 12 may include a reflective layer 50 (FIG. 2) that includes a reflective material dispersed in a polymeric material, thereby rendering the compaction roller 12 laser-reflective.

At Block 204, a beam 30 of electromagnetic radiation may be projected proximate the nip 24 between the compaction roller 12 and the substrate 22. The beam 30 of electromagnetic radiation may have a wavelength. The reflective material in the reflective layer 50 of the compaction roller 12 may have a minimum reflectance (e.g., 80 percent) at the wavelength of the beam 30 of electromagnetic radiation.

At Block 206, a composite ply 18 (e.g., a thermoplastic tow) may be passed through the nip 24 between the compaction roller 12 and the substrate 22. Therefore, the composite ply 18 may be heated by the beam 30 of electromagnetic radiation as it passed through the nip 24.

Thus, the disclosed fiber placement method 200 may facilitate radiative heating of a composite ply 18 as the composite ply 18 passes through a nip 24. However, electromagnetic radiation that reaches the compaction roller 12 may be reflected away from the compaction roller 12, thereby significantly reducing (if not eliminating) electromagnetic radiation-induced degradation of the compaction roller 12.

Figure 6:
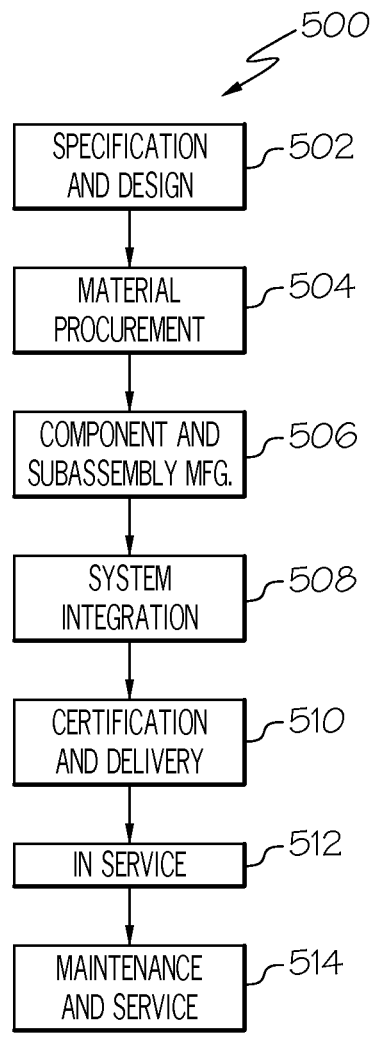
FIG. 6 is a flow diagram of an aircraft manufacturing and service methodology.
Figure 7:
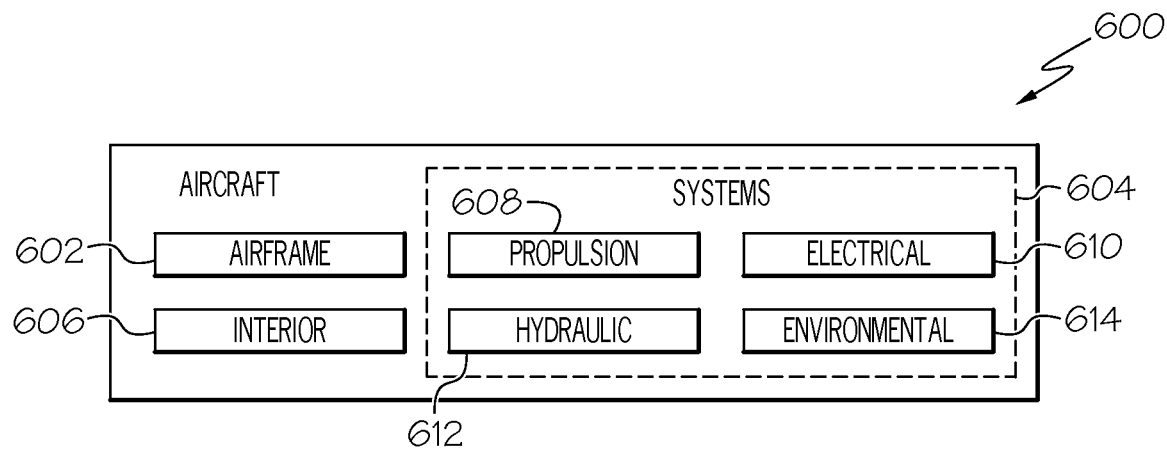
FIG. 7 is a block diagram of an aircraft.

Examples of the present disclosure may be described in the context of an aircraft manufacturing and service method 500 as shown in FIG. 6 and an aircraft 600 as shown in FIG. 7. During pre-production, the illustrative method 500 may include specification and design, as shown at block 502, of the aircraft 600 and material procurement, as shown at block 504. During production, component and subassembly manufacturing, as shown at block 506, and system integration, as shown at block 508, of the aircraft 600 may take place. Thereafter, the aircraft 600 may go through certification and delivery, as shown block 510, to be placed in service, as shown at block 512. While in service, the aircraft 600 may be scheduled for routine maintenance and service, as shown at block 514. Routine maintenance and service may include modification, reconfiguration, refurbishment, etc. of one or more systems of the aircraft 600.

Each of the processes of illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 7, the aircraft 600 produced by illustrative method 500 (FIG. 6) may include airframe 602 with a plurality of high-level systems 604 and interior 606. Examples of high-level systems 604 may include one or more of propulsion system 608, electrical system 610, hydraulic system 612, and environmental system 614. Any number of other systems may be included. Although an aerospace example is shown, the principles disclosed herein may be applied to other industries, such as the automotive and marine industries. Accordingly, in addition to the aircraft 600, the principles disclosed herein may apply to other vehicles (e.g., land vehicles, marine vehicles, space vehicles, etc.).

The disclosed laser-reflective compaction roller and associated fiber placement system and method may be employed during any one or more of the stages of the manufacturing and service method 500. For example, components or subassemblies corresponding to component and subassembly manufacturing (block 506) may be fabricated or manufactured using the disclosed laser-reflective compaction roller and associated fiber placement system and method. Also, the disclosed laser-reflective compaction roller and associated fiber placement system and method may be utilized during production stages (blocks 506 and 508), for example, by substantially expediting assembly of or reducing the cost of aircraft 600. Similarly, the disclosed laser-reflective compaction roller and associated fiber placement system and method may be utilized, for example and without limitation, while aircraft 600 is in service (block 512) and/or during the maintenance and service stage (block 514).

Although various embodiments of the disclosed laser-reflective compaction roller and associated fiber placement system and method have been shown and described, modifications may occur to those skilled in the art upon reading the specification. The present application includes such modifications and is limited only by the scope of the claims.

What is claimed is:

1. A fiber placement system comprising:
   a compaction roller rotatable about an axis of rotation, said compaction roller comprising a reflective layer, said reflective layer comprising a reflective material dispersed in a polymeric material;
   a substrate having a surface for placing a composite ply thereon, wherein said surface of said substrate and said reflective layer define a nip therebetween for passing said composite ply therethrough, wherein said polymeric material of said reflective layer is configured to contact said composite ply when it is passed through said nip; and
   a laser light source positioned to project a laser beam proximate said compaction roller, said laser beam having a wavelength,
   wherein said reflective material has a reflectance of at least 80 percent at said wavelength of said laser beam.

2. The fiber placement system of claim 1 wherein said reflectance is at least 95 percent at said wavelength of said laser beam.

3. The fiber placement system of claim 1 wherein said reflectance is at least 98 percent at said wavelength of said laser beam.

4. The fiber placement system of claim 1 wherein said reflective material comprises flakes having an average aspect ratio of at least 10:1.

5. The fiber placement system of claim 1 wherein said reflective material comprises silver flakes.

6. The fiber placement system of claim 1 wherein a concentration of said reflective material in said reflective layer is about 0.5 percent by weight to about 30 percent by weight of said reflective layer.

7. A fiber placement system comprising:
- a compaction roller rotatable about an axis of rotation, said compaction roller comprising:
  - a hub;
  - a reflective layer in an outermost portion of a cylindrical polymeric structure, said cylindrical polymeric structure comprising said reflective layer in said outermost portion of said cylindrical polymeric structure and a core layer positioned between said hub and said reflective layer, said reflective layer defining an outer cylindrical surface of said cylindrical polymeric structure, said reflective layer comprising a reflective material dispersed in a polymeric material, said reflective layer having a hardness ranging from about 25 Shore A to about 90 Shore A durometer; and
  - a cover of release material applied directly onto said outer cylindrical surface of said cylindrical polymeric structure as defined by said reflective layer;
- a substrate having a surface for placing a composite ply thereon, wherein said surface of said substrate and said cover of release material define a nip therebetween for passing said composite ply therethrough, wherein said cover of release material is configured to contact said composite ply when it is passed through said nip; and
- a laser light source positioned to project a laser beam proximate said compaction roller, said laser beam having a wavelength, wherein said wavelength of said laser beam ranges from about 15 μm to about 1000 μm, wherein said reflective material has a reflectance of at least 80 percent at said wavelength of said laser beam.

8. The fiber placement system of claim 7 wherein said reflectance is at least 85 percent at said wavelength of said laser beam.

9. The fiber placement system of claim 7 wherein said reflectance is at least 90 percent at said wavelength of said laser beam.

10. The fiber placement system of claim 7 wherein said reflectance is at least 95 percent at said wavelength of said laser beam.

11. The fiber placement system of claim 7 wherein said reflectance is at least 98 percent at said wavelength of said laser beam.

12. The fiber placement system of claim 7 wherein said reflective material comprises flakes having an average aspect ratio of at least 10:1.

13. The fiber placement system of claim 7 wherein said reflective material comprises silver flakes.

14. The fiber placement system of claim 7 wherein a concentration of said reflective material in said reflective layer is about 0.5 percent by weight to about 30 percent by weight of said reflective layer.

15. The fiber placement system of claim 7 wherein a concentration of said reflective material in said reflective layer is about 1 percent by weight to about 20 percent by weight of said reflective layer.

16. The fiber placement system of claim 7 wherein a concentration of said reflective material in said reflective layer is about 2 percent by weight to about 10 percent by weight of said reflective layer.

17. The fiber placement system of claim 7 wherein said hardness ranges from about 30 Shore A durometer to about 80 Shore A durometer.

18. The fiber placement system of claim 7 wherein said hardness ranges from about 40 Shore A durometer to about 60 Shore A durometer.

19. The fiber placement system of claim 7 wherein said cover of release material has a radial thickness of about 10 mil to about 20 mil.

20. The fiber placement system of claim 7 wherein said cover of release material comprises fluorinated ethylene propylene.

* * * * *